Dec. 24, 1935.  M. P. LAURENT  2,025,113
PIPE COUPLING
Filed Dec. 4, 1933
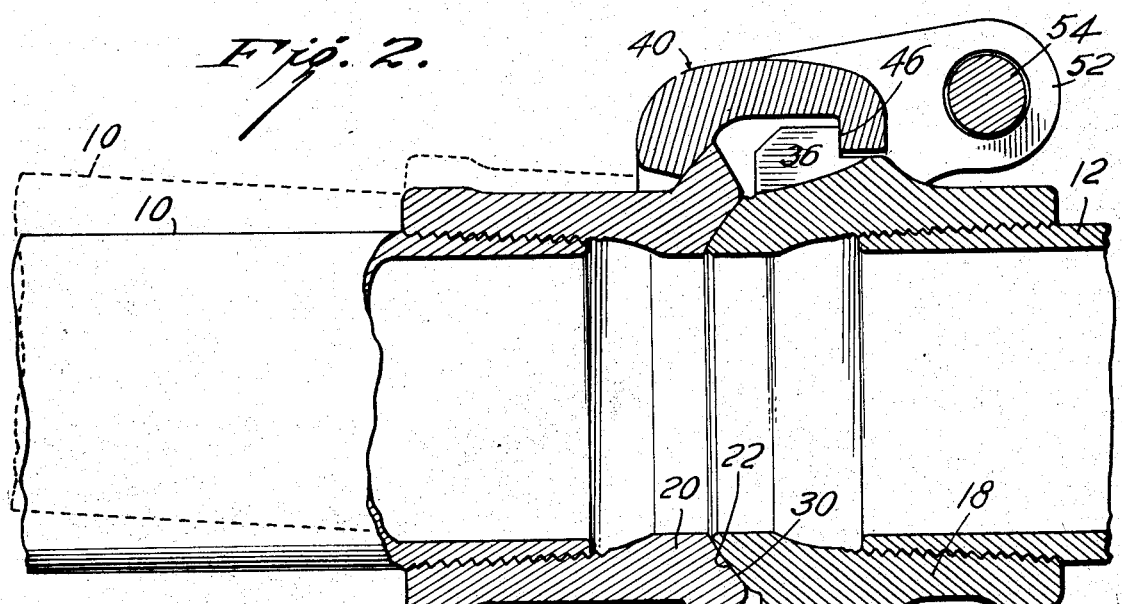
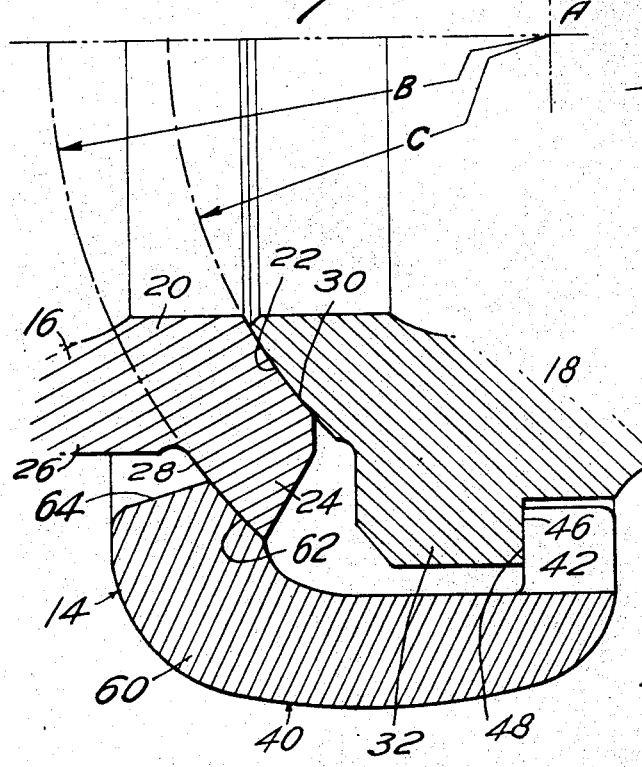
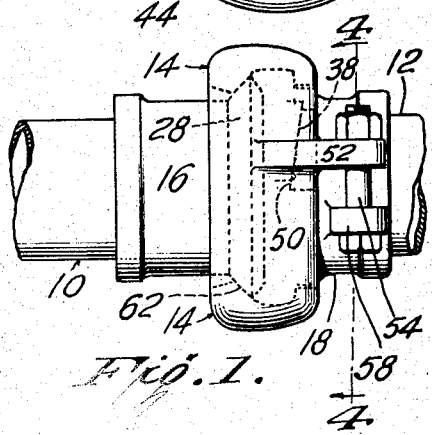
INVENTOR.
MILTON P. LAURENT,
BY
ATTORNEY.

Patented Dec. 24, 1935

2,025,113

UNITED STATES PATENT OFFICE 2,025,113

PIPE COUPLING

Milton P. Laurent, Houston, Tex.

Application December 4, 1933, Serial No. 700,924

3 Claims. (Cl. 285—91)

This invention relates to pipe couplings.

The invention has been specifically applied in the laying, in the field, of mains for gas, oil and the like. In such pipe laying, slight deviations, in consecutive sections of pipe, of the direction of one from the direction of its immediately related section, in normal construction, produces an arrangement, at the immediately associated pipe ends, in which the end faces are "cracked" with relation to each other. In the large majority of instances, the deviation is so small as to make the use of a bend not a requisite. In fact, it occurs that slight variations in the slope of consecutive sections cannot inexpensively be accounted for by such bends, but, by the invention to be described, such construction difficulties are substantially completely obviated. Another factor considered in such construction work is that, with such slight deviations and the consequent failure of the pipe ends to remain properly associated, the strength of the pipe material is dangerously affected.

It is an object of the invention to provide a pipe end construction, and a pipe coupling to cooperate therewith, in which these difficulties of field construction are substantially eliminated, and yet one which, in its entirety, is of simple construction and capable of assembly by relatively unskilled mechanical labor such as generally is found in the field laying such mains.

For purposes of the invention, the opposed faces of the two pipe ends, which are to be brought into abutted relation, may be defined as complementally contoured surfaces, the contouring preferably taking the form of a spherical surface. Such contouring may be produced upon the pipe end, or may be a part of a nipple or similar device secured to, and thus made a part of, the pipe end. By so contouring the pipe end faces, it is possible to move the pipe ends, when the faces are in abutment, with relation to each other, and through diverse and substantial changes of angularity, throughout which changes the positive contacting of the end faces, one upon the other, will remain unaffected.

In order to maintain the pipe ends seated against each other, means may be associated with the pipe ends for assuring the application, at all times, of a positive force to the contacted surfaces. Properly to direct this force, one of the pipe ends is formed with a flange, a face of which has a surface contoured along a surface substantially concentric with the contouring of the contacting end faces. The pressure-applying means for the end faces, by a member having a flange, which seats over the pipe ends and against the contoured flange face, and a proper mechanical arrangement, is caused to draw all these faces into their properly contacted relationship. When this occurs, the pipe ends, where the sections are disposed angularly with relation to each other within a predetermined range, will be retained positively seated one with relation to the other. At the same time, the pressure-applying means permits, without distortion of or strain upon itself, this "cracking" of the sections with relation to each other, as in the construction described no connecting means such as bolts extend from one section to the other. In this particular construction, all the tightening means are mounted upon a single section.

Other objects of this invention will hereinafter be set forth, or will be apparent from the description and the drawing, in which is illustrated a pipe main construction capable of carrying out the invention.

The invention, however, is not intended to be restricted to any such particular construction, or the arrangement of its parts, or to any particular application of any such construction, or to any specific manner of use, or to any of various details thereof herein shown and described, as the same may be modified in various particulars, or be applied in many varied relations, without departing from the spirit and scope of the claimed invention, the pipe main construction herein being merely illustrative and descriptive of one of various possible forms and modifications in which the invention might be embodied.

On the drawing, in which the same reference characters refer to the same parts throughout, and in which is disclosed such a pipe main construction:

Fig. 1 is an elevational view, illustrating an assembly into which there may be introduced pipe end sections of the type embodying the invention;

Fig. 2 is a view in cross-section, and to an enlarged scale, longitudinally through a pair of pipe ends joined together in a manner in accordance with the invention;

Fig. 3 is a view, to a still further enlarged scale, of a detail of the structure shown in Fig. 2, illustrating the relationship of the different surfaces which cooperate for the results of the invention; and Fig. 4 is a view in transverse cross-section, on the line 4—4 of Fig. 1, illustrating certain of the elements involved in the assembly of a coupling such as here shown.

On the drawing, two pipe sections 10 and 12 are shown united by a coupling 14 intended to embody features of the invention. In this case, the coupling is seen to consist of a pair of nipples 16 and 18, each connected to respective pipe sections 10 and 12. A construction is shown in which the nipples are used. However, such construction is not essential to the operation of the invention, as a construction in which the elements to be described are integral parts of, or are integral with, the pipe sections, is applicable for certain purposes of the invention.

Nipple 16 is here shown to have a flanged-out or belled-out end 20, the end face 22 of which, as shown in Figs. 2 and 3, is intended to be contoured to define a portion of a convex surface, and preferably to comprise a portion of a spherical surface having a radius C. The flanged-out end may be so formed as to provide a flange 24 extending beyond the outer face 26 of the pipe wall construction. By this construction there is disposed, in conjunction with end face 22, a wall 28. This wall is contoured along a surface following closely the shaping of the surface of face 22. For this reason, in the instance here disclosed, wall 28 has the contouring of a spherical surface substantially of a radius B. For certain purposes of the invention, it is desirable that both radii B and C have a common center A.

Nipple 18 has its end face 30 contoured to follow substantially the contouring of face 22, that is, to be the complement of the contouring of that face. By such construction, when face 22 is concave, as here, then face 30 would be convex, as shown, and vice versa. Thus, when the two faces are brought into abutment one with the other, they will, with ease, interfit and permit angular movement of their associated pipe sections with relation to each other, while maintaining the ability to produce a perfectly sealed joint. By the construction shown, with faces 22 and 30 in abutment, movement of nipple 18 with relation to nipple 16 will occur while point A, the center of the relatively moving faces, will remain stationary. That is, as the angularity of sections 10 and 12 is changed, and as faces 30 and 22 move relatively, if the surfaces are properly contoured, and if the section carrying face 30 be considered stationary, point A will, of course, remain fixed. Throughout such relative movement, the seating of faces 22 and 30 one upon the other, in producing a leak-proof joint, will be unaffected.

To maintain the two faces seated one against the other in positively contacted relation, one of the nipples, and, in this case, nipple 18, may have associated therewith a flange 32, which, as shown in Fig. 4, may, in fact be a plurality of arms 34 separated by notches 36. On a selected number, or on all, of the arms there may be delineated cams 38.

An annulus 40, to be seated over flange 32, has an inturned flange 42 which is formed with a plurality of cut-outs 44. Notches and cut-outs cooperate so that the annulus may be slipped into position by sliding arms 34 through cut-outs 44. Face 46 of flange 42 will then be brought into abutment with the substantially vertical face 48 of flange 32. On face 44 there may be a plurality of cam elements 50 to cooperate with cams 38.

In the construction here shown, a lug 52 extends rearwardly from the annulus, and has an opening through which extends a bolt 54 carrying a nut 56. This bolt may be retained in an opening formed through a lug 58, here shown integrally formed with nipple 18. By tightening nut 56 on bolt 54, the annulus will be caused to rotate relatively to nipple 18, bringing cams 38 and elements 50 into cooperation to move the annulus longitudinally with relation to the pipe sections.

The annulus also has an inturned portion 60 having a concavely formed face 62. In this case, face 62 is shaped spherically to conform substantially to the contouring of wall 28. As movement is imparted to the annulus through the initiation of bolt 54 and its cooperating means, face 62 will act against wall 28. As the parts are substantially exactly contoured, they will fit together smoothly, even where there is a marked angularity in the relationship of associated sections. The annulus, by being cut away as at 64, provides a sufficient spacing so that one of the sections may be adjusted angularly in this manner with relation to the other. By a construction of this type, flange 32 and face 46 may be substantially as shown, or any other desired formation may be used at this point, without any material effect upon the construction, as only one contacting portion of the annulus need have a specifically contoured surface, as here the spherically contoured face 62. Bolts to unite the several sections of a coupling, as customarily required, are made unnecessary, thus avoiding any serious dirt collection, and the weakened construction found in such normally bolted constructions. The annulus here shown also covers over the entire line of union of the two pipe ends, forming a guard for the united ends and thus keeping out dirt and other undesirable elements, and otherwise protecting the joint against injury.

Many other changes could be effected in the particular coupling structure here shown, and in the methods of use set forth, and in specific details thereof, without substantially departing from the invention of the claims, the specific description herein being merely to illustrate one operative embodiment carrying out the spirit of the invention.

What is claimed as new and useful is:—

1. Means for coupling two pipe-elements together, the elements being provided with complemental portions to be brought together in end to end relation, the elements having lateral projections from the outer faces thereof, an annular coupling member for positioning over the complemental portions, said coupling member being provided with inwardly directed projections to engage the lateral projections on the elements, some of the lateral projections and the inwardly directed projections being formed to cooperate with each other as wedging cam faces, and means for compelling the coupling member and the elements to move relatively to each other for making the cam faces effective to drive the complemental portions together, the compelling means comprising a single bolt carried between a pair of ears disposed on the coupling member and one of the elements respectively, so that the bolt extends between the ears in a direction substantially at right angles to the direction of the elements.

2. Means for coupling two pipe-elements together, the elements being provided with complemental portions to be brought together in end to end relation, the elements having lateral projections from the outer faces thereof, an annular coupling member for positioning over the complemental portions, said coupling member being provided with inwardly directed projections to engage the lateral projections on the elements, some of the lateral projections and the inwardly directed projections being formed to cooperate with each other as wedging cam faces, and means for compelling the coupling member and the elements to move relatively to each other for making the cam faces effective to drive the complemental portions together, the compelling means comprising an apertured lug carried by said coupling member, a bolt passing through the aperture of the lug and engaging a bolt-anchoring means, whereby force can be applied in a right line direction to said lug for making said cam faces effective to drive the complemental portions together.

3. Means for coupling two pipe-elements together, the elements being provided with complemental portions to be brought together in end to end relation, the complemental portions being of substantially spherical contouring, so that they will seat for rotation one on the other, the elements having lateral projections from the outer faces thereof, an annular coupling member for passing over the complemental portions, said coupling member being provided with inwardly directed projections to engage the lateral projections on the elements, some of the lateral projections and the inwardly directed projections being formed to cooperate with each other as wedging cam faces, the others of the lateral projections and the inwardly directed projections having cooperating faces disposed to lie in the surface of a sphere substantially concentric with the spherical contouring of the complemental portions brought into end to end relationship, and means for compelling the coupling member and the elements to move relatively to each other for making the cam faces effective to drive the complemental portions together, the compelling means comprising an apertured lug carried by said coupling member, a bolt passing through the aperture of the lug and engaging a bolt-anchoring means, whereby force can be applied in a right line direction to said lug for making said cam faces effective to drive the complemental portions together.

MILTON P. LAURENT.